No. 840,835. PATENTED JAN. 8, 1907.
J. A. & J. J. FLANAGAN.
DRAFT EQUALIZER.
APPLICATION FILED JAN. 4, 1906.
2 SHEETS—SHEET 1.
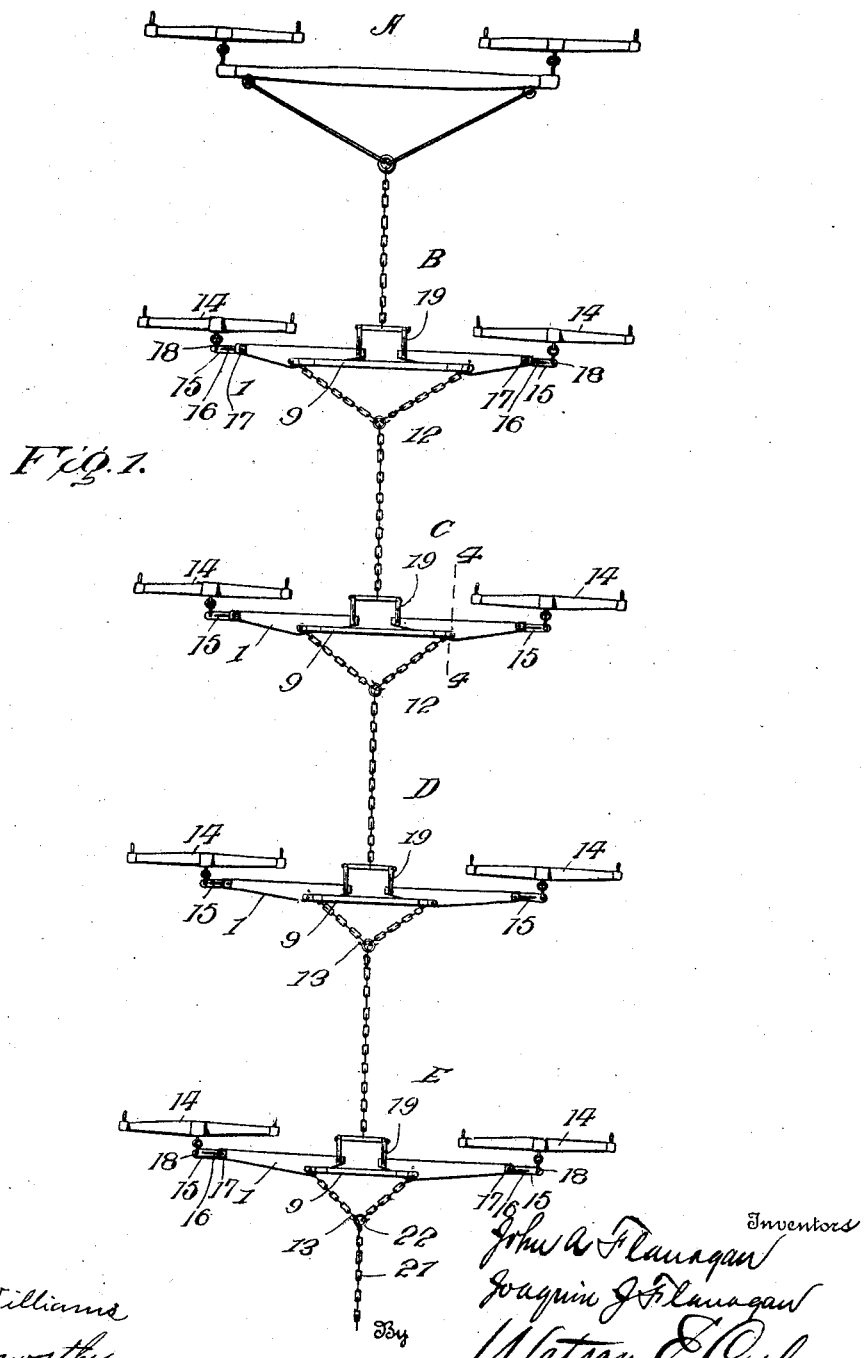

No. 840,835. PATENTED JAN. 8, 1907.
J. A. & J. J. FLANAGAN.
DRAFT EQUALIZER.
APPLICATION FILED JAN. 4, 1906.
2 SHEETS—SHEET 2.
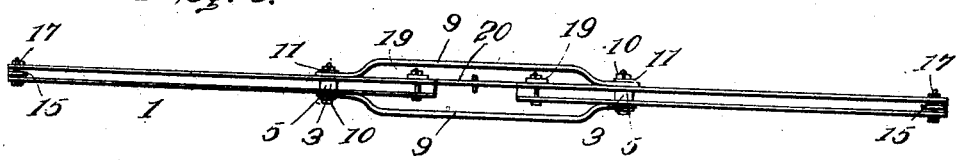
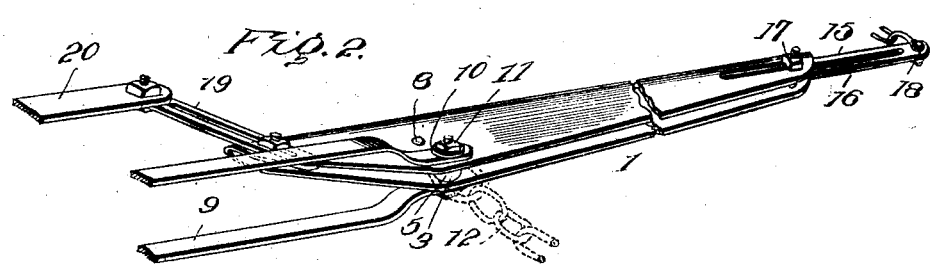
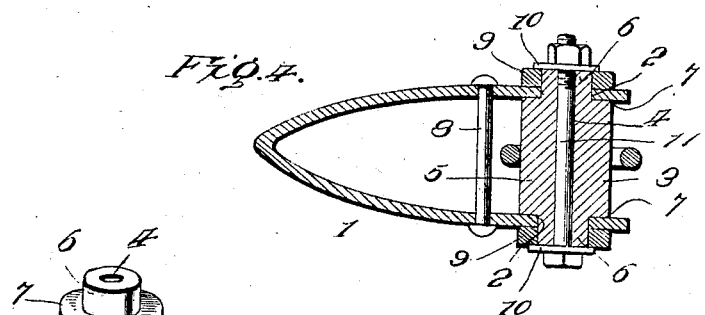
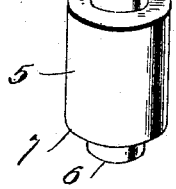
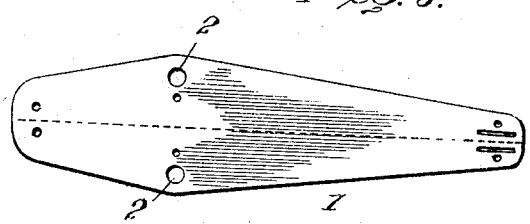
Witnesses
W. A. Williams
L. O. Langworthy
Inventors
John A. Flanagan
Joaquin J. Flanagan
By Watson E. Coleman
Attorney
THE NORRIS PETERS CO., WASHINGTON, D. C.

UNITED STATES PATENT OFFICE.

JOHN A. FLANAGAN AND JOAQUIN J. FLANAGAN, OF CORNING, CALIFORNIA.

DRAFT-EQUALIZER.

No. 840,835.  Specification of Letters Patent.  Patented Jan. 8, 1907.

Application filed January 4, 1906. Serial No. 294,621.

*To all whom it may concern:*

Be it known that we, JOHN A. FLANAGAN and JOAQUIN J. FLANAGAN, citizens of the United States, residing at Corning, in the county of Tehama and State of California, have invented certain new and useful Improvements in Draft-Equalizers, of which the following is a specification, reference being had therein to the accompanying drawings.

The invention relates to an improvement in draft-equalizers designed primarily for use with teams of four or more animals hitched in pairs.

The main object of the invention is the production of an equalizing-stretcher arranged to compel the animals connected thereto to pull their share of the load.

In moving heavy loads by the use of a number of connected teams of animals the usual arrangement is to couple each individual of a pair of animals or teams to the respective ends of a stretcher, which in turn is centrally connected with the load, usually through what is termed a "fifth-chain." The present invention is designed primarily to improve this stretcher, to equalize the draft of the respective animals of any one team, and to so arrange the stretchers of the various teams as to equalize the pull of one team relative to another.

The invention will be described in the following specification, reference being had particularly to the accompanying drawings, in which—

Figure 1 is a plan illustrating the application of our invention for use with five connected teams of animals. Fig. 2 is an enlarged perspective view of one of the primary levers forming a part of the equalizing-stretcher. Fig. 3 is a rear edge view of the complete stretcher. Fig. 4 is a transverse section of one of the primary levers on the line 4 4 of Fig. 1. Fig. 5 is a perspective view of the fulcrum-block for said primary levers. Fig. 6 is a plan of the blank from which the primary levers are formed.

Referring to the drawings, our improved construction comprises in its essential parts an equalizing structure made up of duplicate primary levers arranged in alinement transverse the line of draft and each provided with a fulcrum-block. Connector-straps join the respective fulcrum-blocks of the primary levers, and draft-chains extend from said fulcrum-blocks to the fifth-chain. The outer ends of each of the primary levers are connected through the medium of a lap-link or clevis with an ordinary swingletree, while the extreme inner or proximate ends of said levers are connected to the respective ends of a secondary lever positioned in advance of the primary levers and centrally connected to the fifth-chain, which extends forward to the next succeeding equalizing structure.

The primary levers 1 of each stretcher are preferably constructed of sheet metal primarily cut, as indicated in Fig. 6, wherein the blank is shown to have reduced ends and an intermediate portion of extreme width. In forming the lever the blank is bent along its longitudinal median line (indicated by dotted line in Fig. 6) to arrange one-half of said blank above the other, the free edges of the blank when properly positioned being in alinement and spaced apart, whereby to provide an approximate V-shaped lever in transverse section, as shown in Fig. 4. By this construction the primary lever comprises upper and lower plates integral at their forward edges and spaced apart at their rear edges, the forward edge of the lever forming an uninterrupted straight line, while the rear edge is inclined from each end of the lever toward the point of greatest transverse width, hereinafter termed the "fulcrum-point" of the lever.

At the fulcrum-point the respective plates of the lever are each formed with an opening 2, in which is removably inserted the fulcrum-block 3. The block 3 is of cylindrical form with a central longitudinal bore 4, the central portion of the block being enlarged to provide a barrel 5. The extensions 6 of the block beyond the barrel are of a size to fit the openings 2 in the respective plates of the lever and of a length to extend beyond the respective upper and lower surfaces of said plates. When in place in the lever, the fulcrum-block provides a support for the lever-plates at the fulcrum-point, it being understood that said plates rest against the respective upper and lower shoulders 7, formed at the junction of the barrel 5 with the extensions 6, whereby said plates are maintained in desired relative position. A rivet 8 or other suitable fastening means is passed through the respective plates of the lever somewhat in advance of the fulcrum-block, thereby securing the fulcrum-block in applied position. The upper and lower extensions of the fulcrum-blocks of each of the two levers forming the equalizing structure are connected by straps 9, preferably having offset end portions each formed with an opening designed to snugly embrace the extension. It is to be understood that, as shown, two of said straps are arranged between the respective levers of each equalizing structure, one strap being above and in contact with the upper plate, while the other rests below and in contact with the lower plate, both the straps bridging the space between the fulcrum-points of the respective levers. The openings in the ends of the straps snugly fit the extensions 6, and the thickness of the straps at the point of connection is slightly less than the projection of the extension 6 beyond the respective plates. The straps are secured in place by washers of greater diameter than the openings in the straps and resting upon the free ends of the projections 6, as at 10, the washers of each fulcrum-block being held in place by an ordinary bolt 11, passed through the bore 4 in the block and terminally secured by a nut or other fastening means. Draft-chains 12 extend in a rearward direction from each fulcrum-block of the stretcher, the forward links of said chains preferably encircling the barrel of the fulcrum-block, as shown, the rivet 8 being arranged sufficiently in advance of the fulcrum-block to permit the described engagement of the chain. The rear ends of the draft-chains are provided with hooks 13 for a purpose to be later described.

The outer end of the lever 1, hereinafter termed the "primary" lever, is adapted for connection with an ordinary swingletree 14, the medium of connection being an ordinary lap-link or clevis. Said outer end of primary lever is adjusted in length by the medium of a link-bar 15, formed with a longitudinal slot 16, designed to receive a pin 17, passed through the respective plates of the lever, the outer end of said link-bar being formed with an opening 18 to receive the lap-link or clevis which connects it to the swingletree. The link-bar is arranged between the respective plates of the lever, the forward connected edge of said plates being slitted at this point to facilitate the binding of said plates upon the link-bar through the medium of the bolt 17 when securing said bar in adjusted position.

The inner or proximate ends of the primary levers forming the equalizing-stretcher are connected by links 19 to the respective ends of a secondary lever 20, which lever may be of any desired configuration in plan or section.

In the use of the equalizing-stretcher in connection with five coupled teams, as shown in Fig. 1, the leading team A will use the stretcher of common or usual type, while each of the succeeding teams, as B, C, D, and E, will use the equalizing-stretcher described. As the pull or draft of the respective teams upon the load will vary in effect as the position of that team relative to the leading team varies, it is obvious that duplicate equalizing-stretchers will not serve for each succeeding team. Therefore to enable the respective teams to exert a proper and effectively-uniform draft upon the load the equalizing-stretcher of each team is varied. This is accomplished by changing the fulcrum-point of the primary levers of each of the respective stretchers, that of the primary levers forming the stretcher of team B being centrally arranged longitudinally of the primary lever; that of the third team C is arranged so that the proportions of the outer and inner fulcrum lengths of the lever are as two to one; for teams D the proportion of the fulcrum lengths is as three to one, while for team E the proportions are as four to one. As the energies of each team are exerted over a fulcrum instead of pulling directly against the load, this variation in fulcrum lengths for the respective teams provides for a uniform distribution of the draft.

The fifth-chain, while practically constituting a continuous chain, is in reality a series of short lengths, as at 21, the rear end of which is connected to the central point of one of the secondary levers 20, while the forward end is provided with a ring 22, designed to receive the hooks 13, secured on the rear ends of the draft-chains leading from the primary levers. It is understood, of course, that the rear end of the fifth-chain section 21, connected to the equalizing-stretcher of the last chain, as at E, is secured directly to the load.

In the use of the equalizing-stretcher described an even and uniform draft is exerted on the fifth-chain by each team no matter how many are coupled in file, while the use of the link-bar 15 provides for such adjustment of the relative lengths of any of the primary levers as may be necessary to accommodate the same for animals of unequal size in the team.

The described construction of primary levers renders the device as a whole comparatively light without depriving it of necessary strength and, furthermore, provides a cheap and convenient means for and manner of constructing said levers.

Having thus described the invention, what is claimed as new is—

1. A draft-equalizer comprising a series of team connections arranged in file formation and each consisting of a pair of primary levers, fulcrum-blocks arranged in said levers, the fulcrum-blocks of the levers of each of the respective connections being disposed to vary the fulcrum lengths of said levers with respect to the position of the team connection in the file formation, spacing-straps having their ends engaged with the fulcrum-blocks of each pair of levers, swingletrees upon the outer ends of said levers, secondary levers, links connecting said secondary levers to the inner ends of the primary levers, connections between each of said secondary levers and the fulcrum-blocks of the team connection in advance of said secondary lever, means for attaching the rearmost team connection to the load, and a doubletree attached to the secondary lever of the foremost team connection.

2. A draft-equalizer comprising a series of team connections arranged in file formation and each consisting of a pair of primary levers, fulcrum-blocks arranged in said levers, upper and lower spacing-straps connecting the levers of each pair and having their ends secured to the ends of the fulcrum-blocks in said levers, longitudinally-slotted extension-bars adjustably mounted upon the outer ends of said levers, swingletrees carried by said extension-bars, secondary levers, slotted links connecting said secondary levers to the inner ends of the primary levers, fifth-chain connections between the fulcrum-blocks of the levers of one team connection and the secondary lever of the next adjacent team connection, means for attaching the fulcrum-blocks of the rearmost team connection to the load, and a doubletree attached to the secondary lever of the foremost team connection.

3. A draft-equalizer comprising a series of team connections arranged in file formation and each having a pair of primary levers disposed in longitudinal alinement with each other and each consisting of spaced upper and lower plates, the outer ends of said plates being formed with longitudinal slots, fulcrum-blocks having enlarged barrels to fit between the plates of the levers and end extensions to project through apertures in said plates, upper and lower spacing-straps having apertured ends to engage the extended ends of said fulcrum-blocks, fastenings passed through said straps and fulcrum-blocks to secure said parts together, longitudinally-slotted extension-bars arranged between the slotted outer ends of the plates of said levers, fastenings passed through the slots in said lever-plates and said extension-bars for adjustably securing the latter between the former, swingletrees carried by said extension-bars, secondary levers, links connecting the latter to the inner ends of said primary levers, fifth-chain connections between the fulcrum-blocks in one team connection and the secondary lever in the adjacent team connection, means for attaching the fulcrum-blocks of the rearmost team connection to the load, and a doubletree attached to the secondary lever of the foremost team connection.

4. An equalizing-stretcher comprising duplicate primary levers arranged in alinement end to end and each consisting of spaced upper and lower plates, the outer ends of said plates being formed with longitudinal slots, fulcrum-blocks having enlarged barrel portions arranged between the said lever-plates and end extensions projecting through apertures in said lever-plates, upper and lower spacing-straps having apertures at their ends to engage the extended ends of said fulcrum-blocks, longitudinally-slotted extension-bars arranged between the slotted outer ends of said lever-plates, fastening devices passed through the slots in said lever-plates and said extension-bars for adjustably securing the latter between the former, swingletrees attached to said extension-bars, means for attaching the fulcrum-blocks of said levers to the load and a draft connection attached to the inner ends of said levers.

In testimony whereof we hereunto affix our signature in presences of two witnesses.

JOHN A. FLANAGAN.
JOAQUIN J. FLANAGAN.

Witnesses:
  A. B. AITKEN,
  R. B. AITKEN.